United States Patent
Li et al.

(10) Patent No.: US 9,800,926 B2
(45) Date of Patent: Oct. 24, 2017

(54) PEER-TO-PEER VIDEO DATA SHARING

(75) Inventors: Jian Li, San Ramon, CA (US);
Raghvendra Savoor, Walnut Creek, CA (US); Zhi Li, Martinez, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1600 days.

(21) Appl. No.: 12/191,123

(22) Filed: Aug. 13, 2008

(65) Prior Publication Data
US 2010/0043034 A1    Feb. 18, 2010

(51) Int. Cl.
| | |
|---|---|
| H04N 7/173 | (2011.01) |
| H04N 21/44 | (2011.01) |
| H04N 21/234 | (2011.01) |
| H04N 21/4788 | (2011.01) |
| H04N 21/6405 | (2011.01) |
| H04N 21/643 | (2011.01) |
| H04N 21/6587 | (2011.01) |

(52) U.S. Cl.
CPC ... *H04N 21/44016* (2013.01); *H04N 7/17318* (2013.01); *H04N 21/23424* (2013.01); *H04N 21/4788* (2013.01); *H04N 21/6405* (2013.01); *H04N 21/64322* (2013.01); *H04N 21/6587* (2013.01)

(58) Field of Classification Search
USPC ......................................................... 725/119
See application file for complete search history.

(56) References Cited

U.S. PATENT DOCUMENTS

| | | | |
|---|---|---|---|
| 7,987,155 B2* | 7/2011 | Fernandez | G06F 17/30017 707/622 |
| 8,050,278 B2* | 11/2011 | Jeffrey | H04L 12/2856 370/395.3 |
| 2003/0237097 A1* | 12/2003 | Marshall et al. | 725/105 |
| 2004/0221309 A1* | 11/2004 | Zaner et al. | 725/46 |
| 2005/0081244 A1* | 4/2005 | Barrett et al. | 725/97 |
| 2006/0075428 A1* | 4/2006 | Farmer | H04N 5/4401 725/38 |
| 2006/0212584 A1* | 9/2006 | Yu et al. | 709/227 |
| 2006/0248561 A1* | 11/2006 | Hashimoto | G11B 20/10 725/100 |
| 2007/0067804 A1 | 3/2007 | Six et al. | |
| 2007/0160038 A1* | 7/2007 | Liu | H04N 7/163 370/389 |
| 2008/0022320 A1 | 1/2008 | Ver Steeg | |
| 2008/0022322 A1 | 1/2008 | Grannan et al. | |
| 2008/0215594 A1* | 9/2008 | Kamei | G06F 17/30023 |
| 2008/0301745 A1* | 12/2008 | Liu | H04N 21/2221 725/110 |
| 2009/0013362 A1* | 1/2009 | Liu et al. | 725/110 |
| 2009/0113253 A1* | 4/2009 | Wang | H04L 65/1013 714/48 |
| 2009/0150935 A1* | 6/2009 | Peters et al. | 725/46 |
| 2009/0158318 A1* | 6/2009 | Levy | 725/32 |
| 2009/0300673 A1* | 12/2009 | Bachet et al. | 725/31 |
| 2010/0250678 A1* | 9/2010 | Hu et al. | 709/204 |

(Continued)

*Primary Examiner* — Mushfikh Alam
(74) *Attorney, Agent, or Firm* — Toler Law Group, PC

(57) ABSTRACT

Systems and methods of peer-to-peer video data sharing are disclosed. A particular system includes a television receiver to receive television data from a server. The system also includes an instant channel change (ICC) module to send a request for ICC data to one or more peer network elements via a peer-to-peer service.

22 Claims, 7 Drawing Sheets

(56) References Cited

U.S. PATENT DOCUMENTS

2010/0293564 A1\* 11/2010 Gould et al. .................. 725/1
2012/0174167 A1\* 7/2012 Walters et al. ................ 725/89
2014/0298373 A1\* 10/2014 Jing .................. H04L 12/2812
　　　　　　　　　　　　　　　　　　　　　725/28

\* cited by examiner

PEER-TO-PEER VIDEO DATA SHARING

FIELD OF THE DISCLOSURE

The present disclosure is generally related to peer-to-peer video data sharing.

BACKGROUND

Media data distribution systems that use packetized data, such as Internet Protocol Television (IPTV) systems, may use instant channel change (ICC) functions to improve user experience when a channel change occurs. For example, the ICC functions may help to mitigate time delays that can be associated with changing channels in certain media data distribution systems. Additionally, certain media data distribution systems may experience reduced video quality when data packets are lost or corrupted during transmission. To address these issues, servers at the media data distribution system may be allocated to provide retransmission data, for example, Reliable-UDP (RUDP) packets, to replace lost or corrupted data.

DETAILED DESCRIPTION

Systems and methods of peer-to-peer video data sharing are disclosed. In a particular embodiment, a system includes a television receiver to receive television data from a server. The system also includes an instant channel change (ICC) module to send a request for ICC data to one or more peer network elements via a peer-to-peer service.

In a particular embodiment, a method includes receiving, at a first set-top box device, first data of a first media data stream from a media data server. The method also includes sending a request related to second data of a second media data stream to a peer-to-peer service. The first media data stream includes a first television channel and the second media data stream includes a second television channel. The method further includes receiving at least a portion of the second data from at least one second set-top box device.

In another particular embodiment, a method at a peer-to-peer service includes storing multicast transmission data. The multicast transmission data indicates a multicast group to which each of a plurality of network elements is joined. The method also includes receiving, from a first network element, a request related to data packets sent to a particular multicast group and determining whether at least one second network element was joined to the particular multicast group when the data packets were sent. When at least one second network element was joined to the particular multicast group when the data packets were sent, the method includes sending information to identify the at least one second network element to the first network element based on the multicast transmission data.

Figure 1:
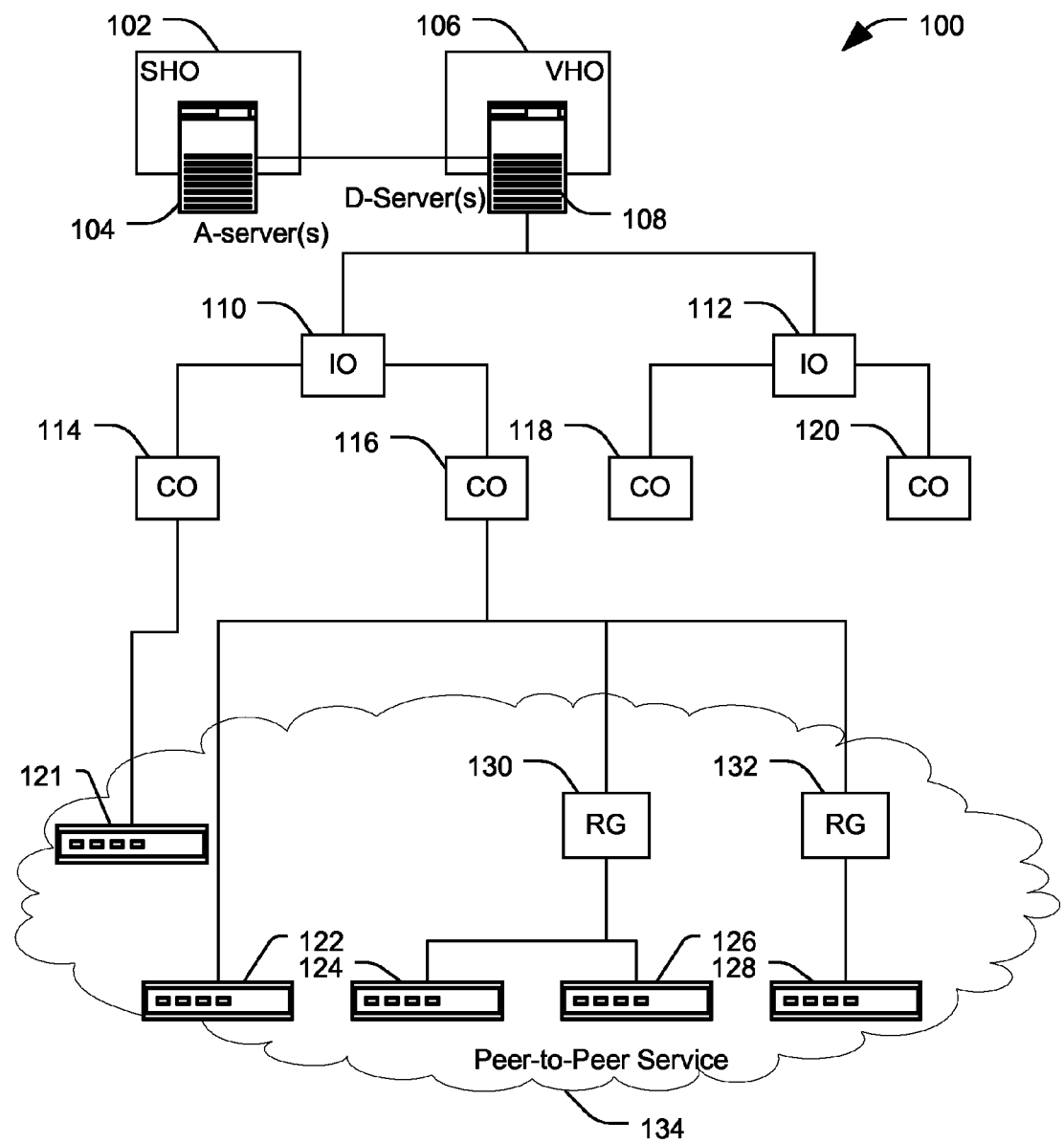
FIG. 1 is a block diagram of a first embodiment of a peer-to-peer video data sharing system.

FIG. 1 depicts a first particular embodiment of a peer-to-peer video data sharing system, designated generally 100. In a particular embodiment, the peer-to-peer video data sharing system 100 may include or may be included within an Internet Television Protocol (IPTV) system. The system 100 includes a super-head end office (SHO) 102 including one or more acquisition servers ("A-servers") 104 coupled to a video head end office (VHO) 106 including one or more distribution servers ("D-Servers") 108. The A-servers 104 may receive or acquire television content, movie content, advertisement content, other video content, or any combination thereof, from a broadcast source. The A-servers 104 may transmit the content to the D-servers 108 for distribution. Additionally, the A-servers 104 may send the content via one or more multicast groups to a plurality of end-user devices, such as a first representative set-top box device 121. The D-servers 108 may store, format, encode, replicate, or otherwise manipulate or prepare video content for communication to the end-user devices. Additionally, the D-servers 108 may be adapted to send Instant Channel Change (ICC) data to an end-user device when the end-user device joins a new multicast group. Further, the D-servers 108 may send reliable user datagram protocol (RUDP) data to an end-user device when the end-user device does not receive a data packet sent via the multicast group to which the end-user device is joined, or when a data packet received by the end-user device is corrupted.

The SHO 102 and VHO 106 are coupled to a plurality of Intermediate Offices (IO), such as representative IOs 110, 112. Each IO 110, 112 may be coupled to one or more central offices (CO), such as representative COs 114 and 116 associated with the first representative IO 110 and representative COs 118 and 120 associated with the second representative IO 112. Each of the COs 114, 116, 118, and 120 may be associated with a plurality of end-user devices, such as set-top box devices, residential gateways, video gaming devices or consoles, personal computers, or any other device adapted to receive media content from the A-servers 104, the D-servers 108 or both. For example, the first representative CO 114 may be coupled to the first set-top box device 121. The second representative CO 116 may be coupled to a plurality of end-user devices, such as a second set-top box device 122 coupled to the CO 116 without the use of a residential gateway, and a third and fourth set-top box devices 124 and 126 coupled to the CO 116 via a shared residential gateway 130. Additionally, a fifth set-top box device 128 may be coupled to the CO 116 via a second residential gateway 132. The system 100 may also include other elements that are not shown, such as Digital Subscriber Line Access Multiplexers (DSLAMs), routers, switches, customer premises equipment, and so forth.

In a particular embodiment, the system 100 also includes a peer-to-peer service 134. The peer-to-peer service 134 may be adapted to store multicast transmission data associated with the end-user devices. For example, the peer-to-peer service 134 may store information indicating the multicast group or groups to which each end-user device is joined at a particular time. In the context of an IPTV system, each multicast group may be associated with a particular television channel. To illustrate, when a particular set-top box device, such as the set-top box device 122, joins a particular multicast group, the peer-to-peer service 134 may generate a record indicating that the set-top box device 122 joined the particular multicast group at a particular time. Thus, when the set-top box device 122 tunes to a particular channel, the peer-to-peer service 134 generates a record indicating the channel to which the set-top box device 122 is tuned and a time at which the set-top box device tuned to the channel. In various embodiments, the peer-to-peer service 134 is distributed between and among one or more of the end user devices, resident upon a particular group of the end user devices, or associated with one or more servers at one or more COs or IOs.

In a particular embodiment, the peer-to-peer service 134 is adapted to facilitate provision of instant channel change (ICC) data packets and/or reliable user datagram protocol (RUDP) data packets to one or more of the end-user devices. For example, the end-user devices may share ICC data and/or RUDP data with one another, and the multicast transmission data at the peer-to-peer service 134 may be used to identify particular end-user devices that have the desired ICC data or RUDP data. To illustrate, when the set-top box device 122 initially tunes to a new channel (e.g., joins a particular multicast group), the set-top box device 122 may send a request to the peer-to-peer service 134 to determine other end-user devices that are tuned to the same channel (e.g., joined to the particular multicast group). The peer-to-peer service 134 may provide information to the set-top box device 122 to identify one or more end-user devices that are joined to the particular multicast group. The set-top box device 122 can then send an ICC request to one or more of the identified end-user devices. The one or more end-user devices may send ICC data to the set-top box device 122 in response to the ICC request.

In another illustrative embodiment, while the set-top box device 122 is tuned to a particular channel, one or more of the data packets of the particular channel may be missing or corrupt. When one or more corrupt data packets are received by the set-top box device 122 or when data packets are missing in a packet stream received at the set-to box device 122, the set-top box device 122 may send a request to the peer-to-peer service 134 to identify other end-user devices that are tuned to the same channel or joined to the same multicast group. The peer-to-peer service 134 may respond by identifying one or more end-user devices that were tuned to the same channel or joined to the same multicast group when the missing or corrupt data packets were sent. The set-top box device 122 may send an RUDP request to one or more of the identified end-user devices. In response to the RUDP request, the end-user devices may send data including the missing or corrupt data packets to the one or more set-top box devices 122. Thus, the system 100 facilitates sharing of ICC data, RUDP data, or both, by peer network elements (such as end-user devices) of a media distribution system (such as an IPTV system). Since the peer network elements share the ICC data and/or RUDP data, the system 100 may be more flexible and scalable than systems that rely on servers to provide ICC data and RUDP data. In a particular embodiment, the D-servers 108 act as a backup source of ICC data and/or RUDP data in the event that no peer network element is able to provide desired ICC data or RUDP data to an end-user device. Further, since in certain embodiments, end-user devices are adapted to buffer television content and data packets prior to or concurrent with display of the television content, no additional hardware may be required at the end-user devices to accommodate the peer-to-peer service 134 and sharing of ICC data and/or RUDP data. Additionally, by distributing the peer-to-peer service 134 over a plurality of end-user devices or other network elements, the peer-to-peer service 134 may be readily scalable as the subscriber base grows thereby reducing costs of deploying additional servers to meet ICC and RUDP demands of the system 100.

Figure 2:
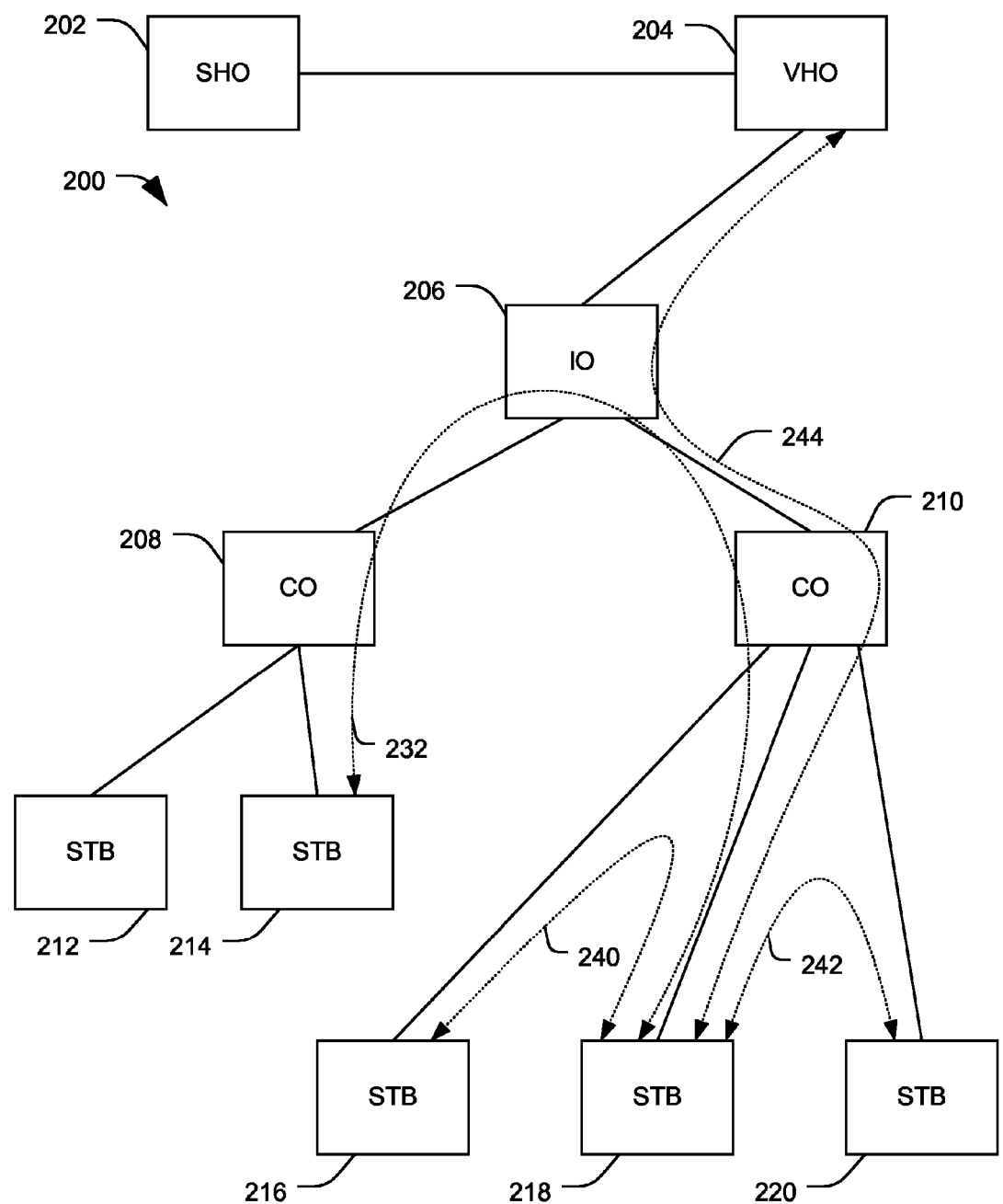
FIG. 2 is a block diagram of a second embodiment of a peer-to-peer video data sharing system.

FIG. 2 depicts a second particular embodiment of a peer-to-peer video data sharing system, designated generally 200. The system 200 illustrates a particular embodiment of sharing of video data by peer network elements. The system 200 includes a super head-end office (SHO) 202, a video head-end office (VHO) 204, one or more immediate offices (IO) 206, and one or more central offices (CO) 208 and 210 coupled to a plurality of end-user devices, such as representative set-top box devices 212, 214, 216, 218, and 220. In a particular embodiment, the system 200 may include or be included within an IPTV television system. Communications within the system 200 are illustrated as dotted lines.

In a particular embodiment, the first representative set-top box device 218 may be tuned to a particular channel (e.g., joined to a particular multicast group associated with the channel). While receiving a packet stream associated with the particular channel, the first representative set-top box device 218 may determine that one or more data packets of the packet stream are missing or corrupt. Missing or corrupt data packets may lead to a reduction in video quality apparent to a viewer. To avoid such a reduction in video quality, the first representative set-top box device 218 may request reliable user datagram protocol (RUDP) data. RUDP data refers to data packets sent to replace missing or corrupt data packets. For example, in an Internet Protocol Television (IPTV) system, television data may be sent in data packets via multicast transmission. Due to bandwidth concerns, among other reasons, the IPTV system may stream the data packets using a protocol that does not guarantee delivery, such as a user datagram protocol. To increase the reliability of delivery and quality of service (QoS) of such data packet stream, provision may be made for a receiver to request that certain data packets be resent, such as data packets that are missing from the packet stream or that are corrupted.

After determining that the data packets are missing or corrupt, the first representative set-top box device 218 may determine whether one or more other set-top box devices were tuned to the same channel (e.g., joined to the same multicast group) when the missing or corrupt data packets were sent. For example, the set-top box device 218 may send an RUDP request to a peer-to-peer service, such as the peer-to-peer service 134 discussed with reference to FIG. 1. To illustrate, assuming the second representative set-top box device 216, the third representative set-top box device 220, or both, were tuned to the same channel when the missing or corrupt data packets were sent, the first representative set-top box device 218 may send the RUDP request to the second representative set-top box device 216 (illustrated as communication path 240), the third representative set-top box device 220 (illustrated as communication path 242), or both, to retrieve the missing or corrupt data packets. In response to the request, the second representative set-top box device 216, the third representative set-top box device 220, or both, may send RUDP data including the missing or corrupt data packets to the first representative set-top box device 218. Typically, the data packets that are missing or corrupt may be a relatively small number of data packets, so only one set-top box device may be requested to provide the RUDP data. However, where larger segments of data are missing or corrupt, more than one set-top box device may be asked to provide RUDP data such that each sends a portion of the data, thereby reducing a load placed on each set-top box device.

In a particular embodiment, when the first representative set-top box device 218 determines that no other nearby set-top box device (e.g., a set-top box device served by the CO 210) that was tuned to the same channel when the missing or corrupt data packets were sent is available for communication, the first representative set-top box device 218 may determine whether one or more remote set-top box devices (e.g., set-top box devices 212 and 214 served by the separate CO 208) were tuned to the same channel when the missing or corrupt data packets were sent. If a remote set-top box is identified such as STB 214, that was tuned to the same channel when the missing or corrupt data packets were sent, the first representative set-top box device 218 may send an RUDP request to the remote set-top box device 214 (via communication path 232) to request the missing or corrupt data packets. In response, the remote set-top box device 214 may send RUDP data including the missing or corrupt data packets to the first representative set-top box device 218.

Further, when the first representative set-top box device 218 determines that no other set-top box device that is available for peer-to-peer communication was tuned to the same channel when the missing or corrupt data packets were sent, the first representative set-top box device 218 may send a request (via communication path 244) to the video head end office 204 to retrieve the missing or corrupt data packets.

In a particular embodiment, when RUDP data including the missing or corrupt data packets are sent, either by the VHO 204 or by a peer network element, such as one of the set-top box devices, the RUDP data may be sent at a rate faster than the rate at which data packets are streamed under normal circumstances. For example, the SHO 202 or VHO 204 may stream data packets of a particular channel to the first representative set-top box device 218 at a first rate. The RUDP data may be sent at a second rate. The second rate may be faster than the first rate. For example, in a particular embodiment, the second rate may be between 1 and 2 times the first rate, e.g., at least about 1.2 times the first rate.

In another particular embodiment, the system 200 may be used to share instant channel change (ICC) data. To illustrate, the first representative set-top box device 218 may use a media data buffer to improve the video quality of the media. For example, since data packets may be received out of order, the media data buffer enables reordering of the data packets for display. Additionally, the media data buffer may introduce a sufficient delay to retrieve missed or corrupt data packets prior to display of received media content. When the representative set-top box device 218 tunes to a new channel, the media data buffer may not include data packets associated with the new channel. The ICC data may be sent to the representative set-top box device 218 to populate the media data buffer with data packets related to the new channel to decrease the time to fill the media data buffer so that the media content can be displayed more quickly.

In a particular embodiment, after the first set-top box device 218 receives a command to tune to a new channel (e.g., to join a new multicast group), the first set-top box device 218 may determine one or more other set-top box devices that are tuned to the same channel. For example, the first set-top box device 218 may send a request to a peer-to-peer service, such as the peer-to-peer service 134 discussed with reference to FIG. 1, to identify other set-top box devices that are tuned to same channel. After determining that the second set-top box device 216, the third set-top box device 220, or both, are joined to the channel, the first set-top box device 218 may send an ICC request (via the communication paths 240 and 242) to either or both of the second and third set-top box devices 216 and 220. Either or both of the second and third set-top box devices 216 and 220 may respond by sending ICC data including recently received data packets related to the channel. In a particular embodiment, each of the set-top box devices 216 and 220 may send a portion of the ICC data. By receiving the ICC data from multiple set-top box devices, the set-top box device 218 may be provided with ICC data quickly to reduce interruption of service without burdening any of the other set-top box devices to provide all of the ICC data.

In a particular embodiment, when the set-top box device 218 determines that no other nearby set-top box device 216, 220 is able to provide the ICC data (e.g., because no other set-top box device is joined to the channel or because of data transmission limitations of the other set-top box devices), the set-top box device 218 may determine whether one or more remote set-top box devices (e.g., set-top box devices associated with a different CO or IO), such as set-top box devices 212 and 214 can provide the ICC data. When one or more remote set-top box devices 212, 214 can provide the ICC data, the set-top box device 218 may send an ICC request to the one or more remote set-top box devices 212, 214. When no remote set-top box device 212, 214 that is available for communication is able to send the ICC data, the set-top box device 218 may send an ICC request to the VHO 204 to retrieve the ICC data.

Figure 3:
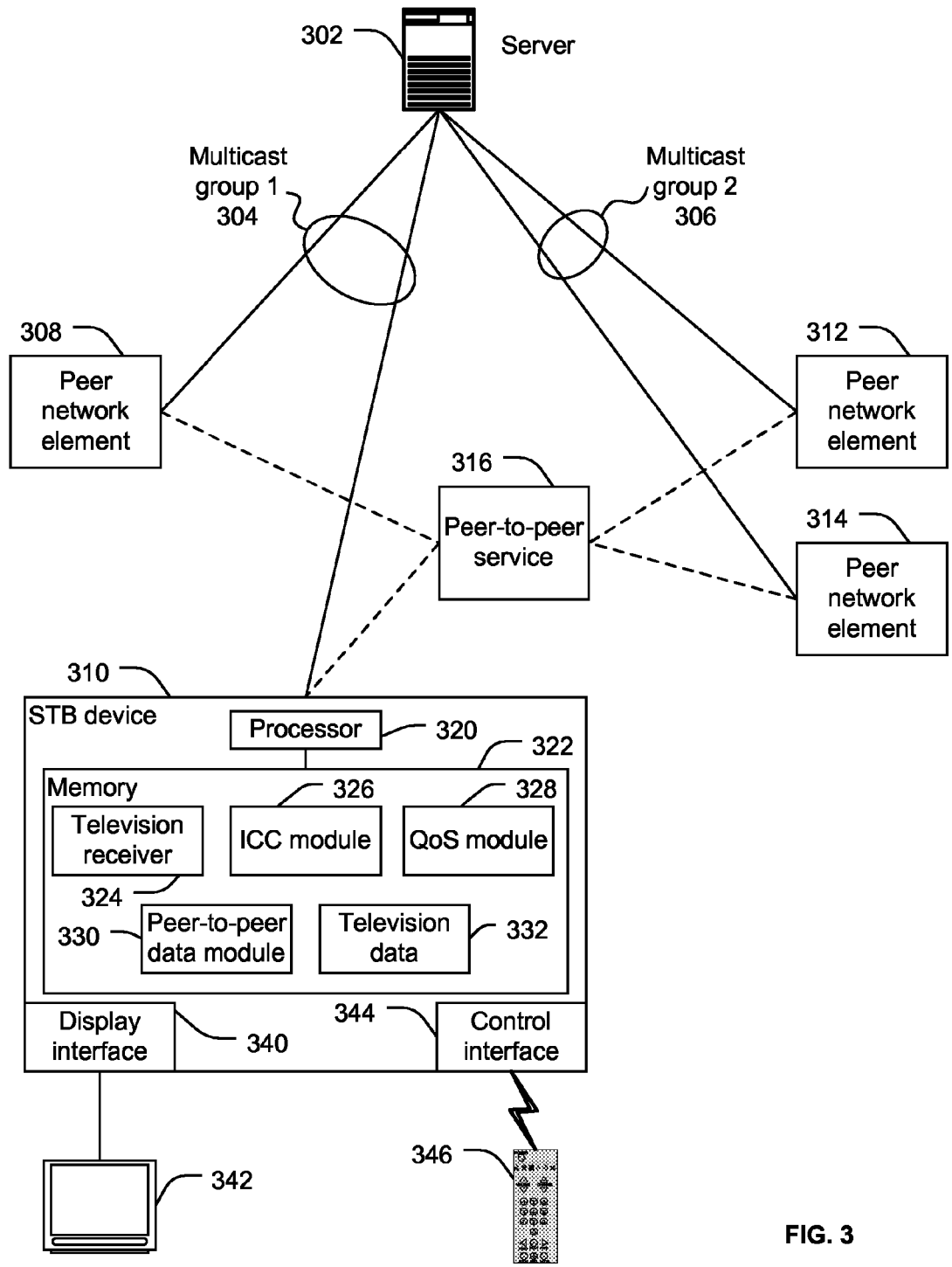
FIG. 3 is a block diagram of a third embodiment of a peer-to-peer video data sharing system.

FIG. 3 depicts a third particular embodiment of a peer-to-peer video data sharing system. The system includes a server 302 adapted to provide media data (such as television data) via one or more multicast groups (such as, a first multicast group 304 and a second multicast group 306) to a plurality of network elements 308, 310, 312, and 314. In a particular embodiment, the server 302 may include an A-server or a D-server as discussed with reference to FIG. 1.

In various embodiments, the network elements 308, 310, 312, 314 may include set-top box devices, residential gateways, video gaming devices or consoles, personal computers, or any other devices adapted to receive media content from the server 302. As illustrated in FIG. 3, the network element 310 is a set-top box device. For purposes of discussion, each of the network elements 308, 310, 312, 314 are considered peer network elements. For example, the peer network elements may include end-user devices adapted to receive media data from the server 302 for presentation to a user. In a particular embodiment, the peer network elements may also (or in the alternative) include devices that are distributed within a communication system, but that are not end-user devices, such as Digital Subscriber Line Access Multiplexers (DSLAMs), switches, routers, and so forth.

The system 300 also includes a peer-to-peer service 316. The peer-to-peer service 316 may be localized at a particular server or set of servers of a communications network (such as an Internet Protocol Television (ITPV) system), or may be distributed through one or more of the peer network elements or other network elements of the communications network. The peer-to-peer service 316 may be adapted to facilitate sharing of video data. For example, the peer-to-peer service 316 may store multicast transmission data that indicates each channel to which each peer network element 308, 310, 312, 314 is tuned at a particular time. To illustrate, where the system 300 communicates media data for each channel via a particular multicast group, the peer-to-peer server 316 may maintain a log of multicast group join requests sent by each peer network element 308, 310, 312, 314.

In a particular embodiment, the set-top box device 310 includes a processor 320 and a memory 322 accessible to the processor 320. The set-top box device 310 also includes a display interface 340 adapted to provide display data to a display device 342 and a control interface 344 adapted to receive control input via a remote control device 346. The set-top box device 310 also includes a plurality of modules adapted to implement various functions of the set-top box device 310. For example, the modules may include a television receiver 324, an instant channel change (ICC) module 326, a quality of service (QoS) module 328, and a peer-to-peer data module 330. In a particular embodiment, the various modules may be implemented as hardware, software executable by the processor 320 or any combination thereof. The set-top box device 310 may also include television data 332 stored in the memory 322. The television data 332 may include data received from the server 302 via a particular multicast group to which the set-top box device 310 was joined. The television data 332 may include data buffered at the memory 322 in order to improve the video quality of the display sent to the display device 342. For example, the television data 332 may include data buffered to allow data packets of the data to be rearranged into a proper order. In another example, the television data 332 may include data buffered to introduce sufficient delay to request replacement data packets for missing or corrupt data packets prior to display at the display device 342. The television data 332 may also include data stored for a longer period of time, such as data buffered to facilitate "trick play" functions, such as pausing, replaying or rewinding "live" television. The television data 332 may also include data stored for an even longer period of time, such as data stored by a video recorder function of the set-top box device 310. For example, the memory 322 may include registers or caches to buffer data packets, a volatile memory to facilitate "trick play" functions, and a non-volatile memory to facilitate the "trick play" functions and/or to provide video recording functions.

In a particular embodiment, the television receiver 324 is adapted to receive media data from the server 302 via a multicast group, such as the first multicast group 304. For example, the server 302 may be a server of an IPTV system, and the television receiver 324 may receive media data by sending a multicast group join request (e.g., using Internet Group Management Protocol (IGMP)) to a network element of the IPTV system.

The ICC module 326 may be adapted to access ICC data when the set-top box device 310 changes channels. For example, the ICC module 326 may send a request for the ICC data to one or more peer elements via the peer-to-peer service 316. To illustrate, when the set-top box device 310 changes to a channel associated with the first multicast group 304, the ICC module 326 may send a request to the peer-to-peer service 316 to determine other network elements that are joined to the first multicast group 304. In response, the peer-to-peer service 316 may send information indicating that the peer network element 308 is also joined to the first multicast group 304. The ICC module 326 may send an ICC request to the peer network element 308 to receive ICC data associated with the first multicast group 304. In a particular embodiment, the peer network element 308 may respond by sending the ICC data based on television data stored at a memory of the peer network element 308 to the set-top box device 310. In a particular illustrative embodiment, ICC data may be sent at a rate higher than the rate at which the server 302 streams the media data to the television receiver 324.

The QoS module 328 may be adapted to identify missed or corrupt data packets in the media data stream received at the television receiver 324 and to attempt to retrieve replacement data packets for the missed or corrupt data packet. For example, after identifying one or more missing or corrupt data packets, the QoS module 328 may send a request to the peer-to-peer service 316 to identify one or more peer network elements that were tuned to the same channel (e.g., joined to the same multicast group) when the missing or corrupt data packets were sent. In response, the peer-to-peer service 316 may indicate that the peer network element 308 was joined to the first multicast group 304 when the missing or corrupt data packets were sent. The QoS module 328 may send an RUDP request to the peer network element 308 to request the missing or corrupt data packets. In a particular embodiment, the peer network element 308 may respond by sending the RUDP data based on television data stored at a memory of the peer network element 308 to the set-top box device 310. In a particular embodiment, RUDP data may be sent at a rate higher than the rate at which the server 302 streams the media data to the television receiver 324.

In a particular embodiment, the peer-to-peer data module 330 may be adapted to send at least a portion of the television data 332 to a peer network element in response to a request from the peer network element. For example, during operation the set-top box device 310 may buffer or otherwise store media data that is received from the television server 302 or from other peer network elements at the memory 322 as the television data 332. When the set-top box device 310 receives an ICC request from a peer network element, such as the peer network element 308, the peer-to-peer data module 330 may send at least a portion of the television data 332 to the peer network element as ICC data. The ICC data may include media data received from the server 302 within a predetermined time period. When the set-top box device 310 receives an RUDP request from a peer network element, such as the peer network element 308, the peer-to-peer data module 330 may send a requested portion of the television data 332 to the peer network element 308 as RUDP data. The requested portion of the television data may include one or more data packets that were missing or corrupt in a media stream received at the peer network element 308 from the server 302. The peer-to-peer data module 330 may be adapted to send the ICC data, the RUDP data, or both, at a rate greater than a rate at which data is received from the server 302. For example, the peer-to-peer data module 330 may send the ICC data, the RUDP data, or both, at a rate between 1 to 2 times, e.g., at least 1.2 times, the rate at which the media data is received from the server 302.

In a particular embodiment, the peer-to-peer data module 330 may be adapted to facilitate one or more functions of the peer-to-peer service 316. For example, the peer-to-peer service 316 may be a distributed service. That is, rather than being provided by a single server or other network element, the peer-to-peer service 316 may be provided by a plurality of network elements, including the set-top box device 310.

Figure 4:
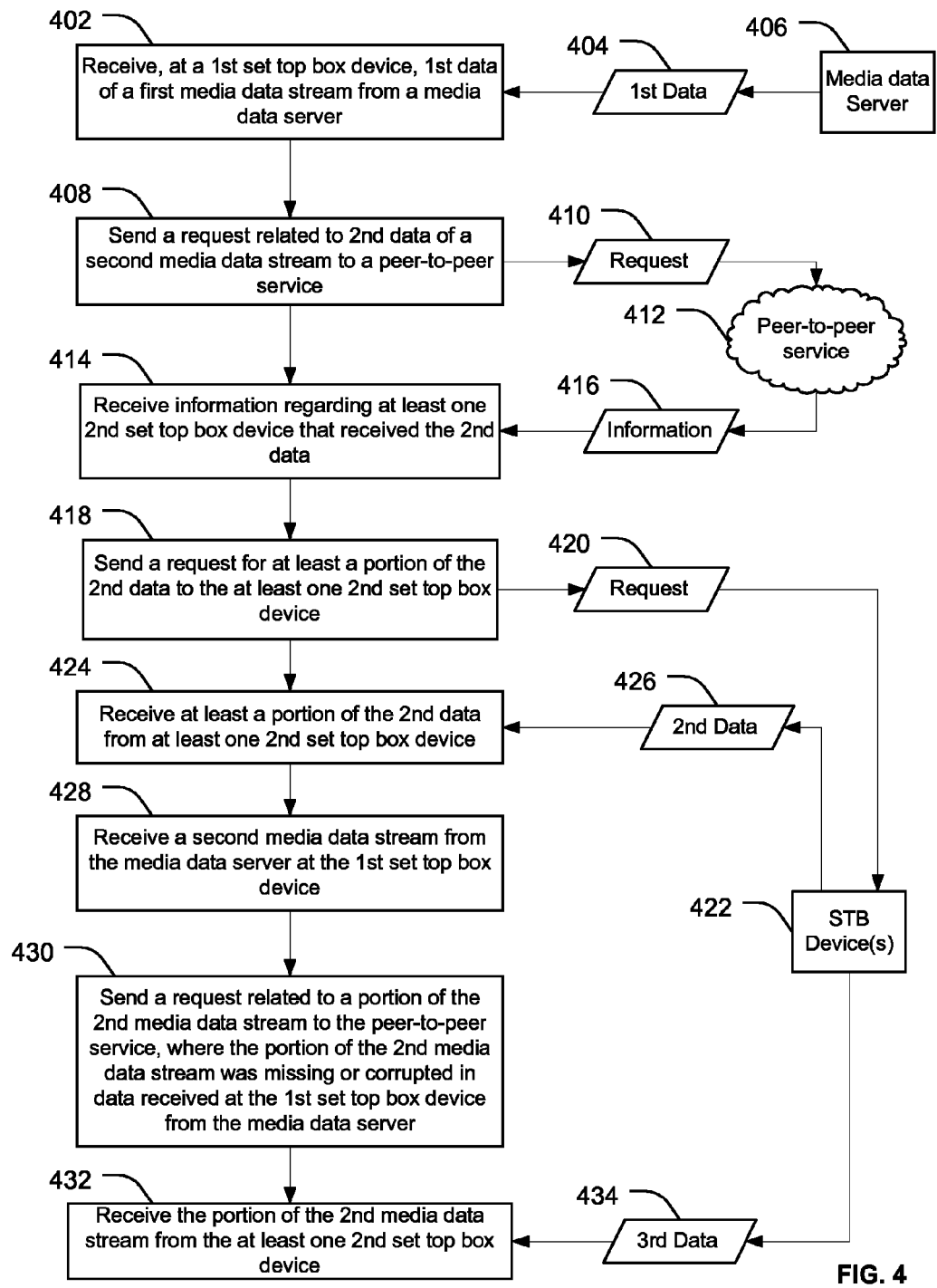
FIG. 4 is a flow chart of a first embodiment of a method of peer-to-peer video data sharing.

FIG. 4 depicts a first particular embodiment of a method of peer-to-peer video data sharing. The method includes, at 402, receiving at a first set-top box device first data 404 of a first media data stream from a media data server 406. In a particular embodiment, the media data server 406 may include a server of an Internet Protocol Television (IPTV) system, an A-server or D-server as discussed with reference to FIG. 1, a server at a super-head end office (SHO), video head end office (VHO), intermediate office (IO) or central office (CO) as discussed with reference to FIG. 2, or the server 302 discussed with reference to FIG. 3.

The method also includes, at 408, sending a request 410 related to second data of a second media data stream to a peer-to-peer service 412. In a particular embodiment, the peer-to-peer service 412 may include a distributed service hosted at a plurality of network elements. For example, the plurality of network elements may include the first set-top-box device, one or more second set-top box devices 422 or any combination thereof. The request 410 may include an instant channel change (ICC) request related to tuning the first set-top box device to a new multicast group or channel. The method may also include, at 414, receiving information 416 regarding at least one second set-top box device 422 that received the second data. To illustrate, the first media data stream may include a first IPTV channel and the second media data stream may include a second IPTV channel. Thus, the second data 426 may include ICC data for the second IPTV channel.

In a particular embodiment, the information 416 may be stored for future reference to reduce delay associated with requesting ICC or reliable user datagram protocol (RUDP) packets. In this embodiment, the method may not include sending the request 410 to the peer-to-peer service 412 or receiving the information 416 from the peer-to-peer service when the information regarding the at least one second set-top box device that received the second data is stored locally. In another particular embodiment, the request 410 may be sent to the peer-to-peer service 412 periodically to obtain the information 416 such that an updated list of set-top box devices that received various media data is maintained.

In a particular embodiment, the method also includes, at 418, sending a request 420 for at least a portion of the second data to the at least one second set-top box device 422. The method may also include, at 424, receiving at least a portion of the second data 426 from the at least one second set-top box device 422. In a particular embodiment, the second data 426 is received from the at least one second set-top box device 422 at a higher rate than the first data 404 is received from the media data server 406. For example, the second data 426 may be received from the at least one second set-top box device 422 at a rate at least about 1.2 times the rate at which the first data 404 is received from the media data server 406. In a particular embodiment, after at least a portion of the second data 426 is received, the first set-top box device may send a multicast group join request to join a multicast group associated with the second media data stream. Thus, when a user of the first set-top box device changes from a first channel associated with the first media data stream to a second channel associated with the second media data stream, the first set-top box device may gather ICC data from one or more other set-top box devices to provide a relatively quick display of the second channel and then join the multicast group associated with the second channel to receive the second media data stream from the media data server, at 428.

In a particular embodiment, after the first set-top box device is tuned to the second channel and receiving the second media data stream from the media data server 406, one or more data packets of the second media data stream may not be received or may be unusable when received. After determining that one or more data packets of the second media data stream are missing or corrupt, the method may include, at 430, sending a request related to at least a portion of the second media data stream to the peer-to-peer service 412. In a particular embodiment, the portion of the second media data stream was missing or corrupted in the second media data stream received at the first set-top box device from the media data server 406. The method may also include, at 432, receiving third data 434 from the at least one second set-top box device 422. The third data 434 may include data packets corresponding to the missing or corrupted portion of the second media data stream.

Figure 5:
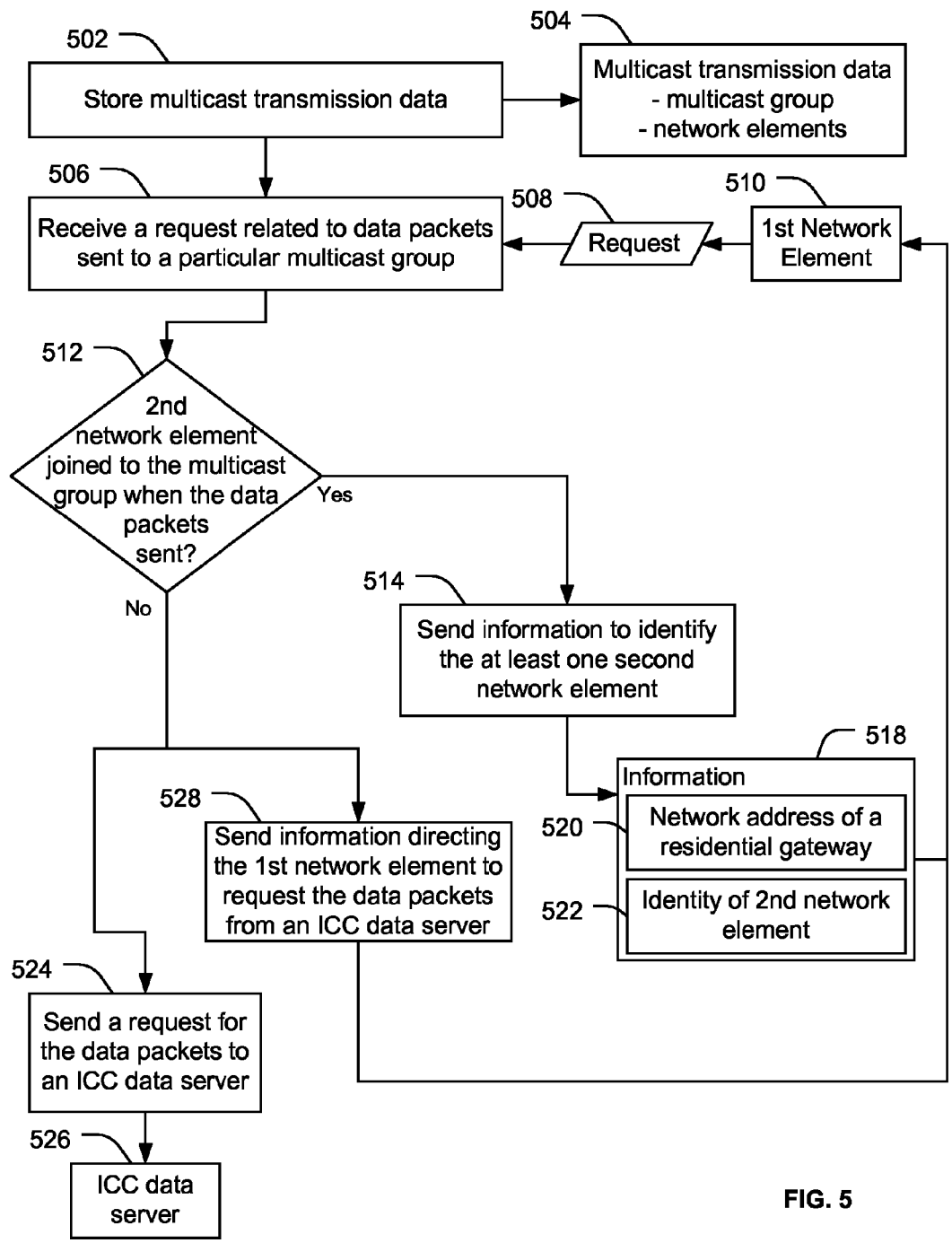
FIG. 5 is a flow chart of a second embodiment of a method of peer-to-peer video data sharing.

FIG. 5 depicts a second particular embodiment of a method of peer-to-peer video data sharing. The method includes, at 502, storing multicast transmission data 504. The multicast transmission data 504 may indicate a multicast group to which each of a plurality of network elements is joined at a particular time. In an illustrative embodiment, the multicast transmission data 504 may be stored at a memory of a particular network element, such as a server, a router, a switch, a Digital Subscriber Line Access Multiplexer (DSLAM), a residential gateway, a set-top box device, or another network element of a media distribution network. In another illustrative embodiment, the multicast transmission data 504 may be stored at memories of a plurality of network elements. For example, the multicast transmission data 504 may be stored in a distributed manner by several network elements.

The method may also include, at 506, receiving, from a first network element 510, a request related to data packets sent to a particular multicast group. For example, the request 508 may be to identify a peer network element that may have desired instant channel change (ICC) data, or the request 508 may be to identify a peer network element that may have replacement data packets for data packets that were missing or corrupt at the first network element 510.

The method may also include, at 512, determining whether at least one second network element was joined to the particular multicast group when the data packets were sent. When at least one second network element was joined to the multicast group when the data packets were sent, the method includes, at 514, sending information to identify the at least one second network element that was joined to the particular multicast group when the data packets were sent. In an illustrative embodiment, the information 518 may include data sufficient to allow the first network element 510 to send an ICC request or reliable datagram protocol (RUDP) request to the at least one second network element. For example, the information 518 may include a network address of the at least one second network element, a network address of a residential gateway associated with the at least one second network element 520, or both. The information 518 may also include an identity of the at least one second network element 522 such that, if the residential gateway is associated with more than second network element (such as two or more set-top box devices), the residential gateway can identify which network element has the desired data. For example, the information 518 may include a network address of a residential gateway and information to identify a particular set-top box associated with the residential gateway. The information 518 may be sent to the first network element 510. In a particular embodiment, the first network element 510 may send a request to the at least one second network element to receive ICC data packets or RUDP data packets based on the information 518.

Returning to 512, when no second network element was joined to the multicast group when the data packets were sent, the method may include, at 528, sending information directing the first network element 510 to request the data packets from an ICC data server or to request the data packets from the RUDP data server, depending on the type of data that is desired. In another particular embodiment, when no second network element was joined to the multicast group when the data packets were sent, the method may include, at 524, sending a request for the data packets to the ICC data server 526 or RUDP data server (not shown) associated with the multicast data transmission.

Embodiments discussed herein may reduce operational costs associated with media distribution networks. For example, in an Internet Protocol Television (IPTV) network, a number of D-servers may be provided in order to meet demand for ICC data and RUDP data. During high demand events, such as the Super Bowl® National Football League, or other events that draw many viewers, a large number of ICC requests and/or RUDP requests may be received. To accommodate such large numbers of requests, an IPTV service provider may allocate additional servers to functions as D-servers, or the IPTV service provider may over-design the IPTV system to include extra capacity for D-servers to accommodate such viewing situations. However, the systems and methods described herein use peer-to-peer data sharing to accommodate ICC requests and RUDP requests. This peer-to-peer data sharing service is flexible and scalable without the need to provide additional D-servers. Additionally, the D-servers of the IPTV system may be available as backup in the event that no peer network element is able to provide the desired ICC data or RUDP data. Additionally, to ensure that no particular network element is overburdened by the ICC requests and/or RUDP requests, the ICC data and/or RUDP data may be provided from more than one network element. Further, no additional hardware may be required to accommodate the peer-to-peer data sharing service since certain network elements, such as set-top box devices, associated with IPTV networks buffer data packets before or during display.

Figure 6:
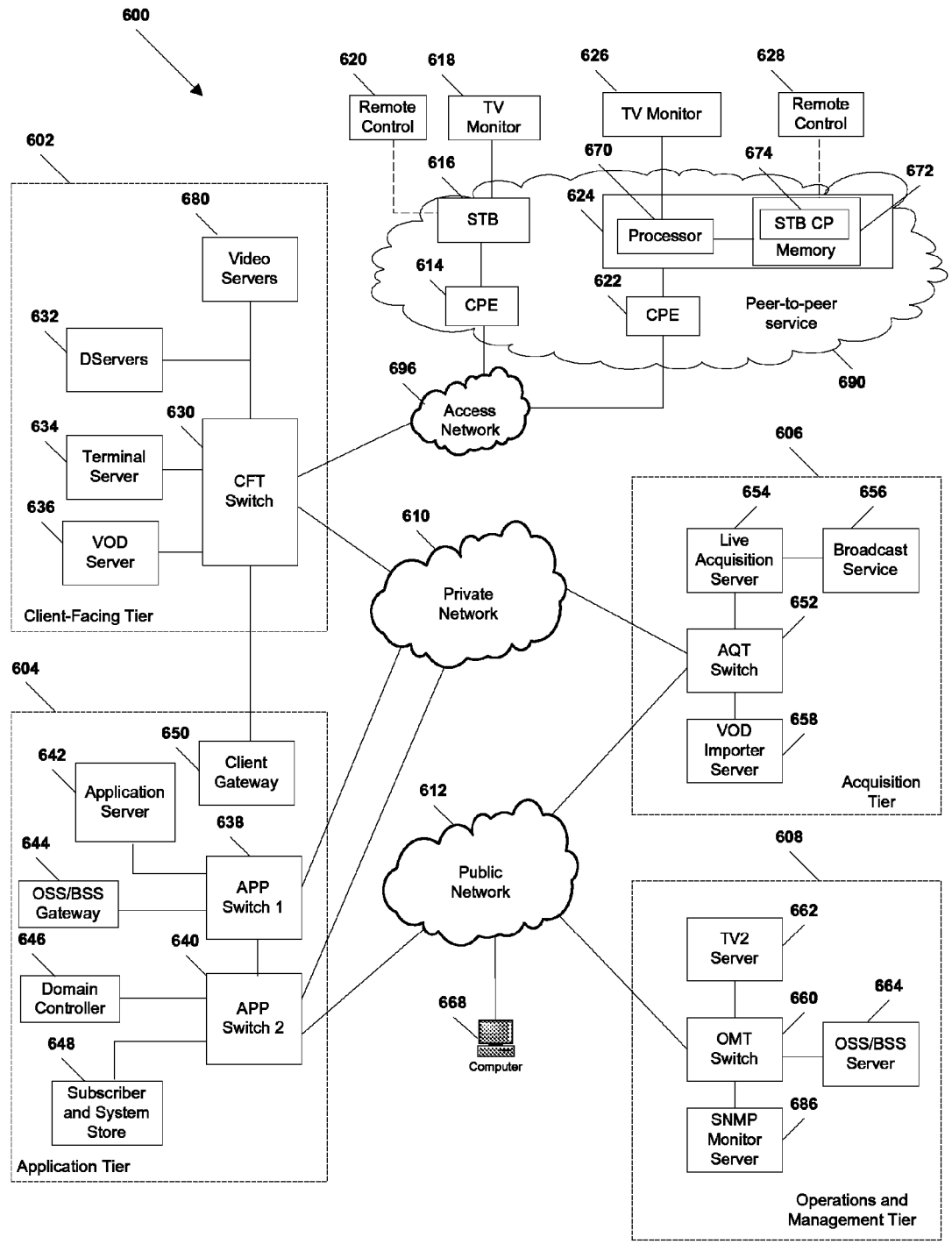
FIG. 6 is a block diagram of an illustrative Internet Protocol Television (IPTV) system.

Referring to FIG. 6, an illustrative embodiment of an Internet Protocol Television (IPTV) system that may be used to provide peer-to-peer data sharing is illustrated and is generally designated 600. As shown, the system 600 can include a client facing tier 602, an application tier 604, an acquisition tier 606, and an operations and management tier 608. Each tier 602, 604, 606, 608 is coupled to a private network 610; to a public network 612, such as the Internet; or to both the private network 610 and the public network 612. For example, the client-facing tier 602 can be coupled to the private network 610. Further, the application tier 604 can be coupled to the private network 610 and to the public network 612. The acquisition tier 606 can also be coupled to the private network 610 and to the public network 612. Additionally, the operations and management tier 608 can be coupled to the public network 612.

As illustrated in FIG. 6, the various tiers 602, 604, 606, 608 communicate with each other via the private network 610 and the public network 612. For instance, the client-facing tier 602 can communicate with the application tier 604 and the acquisition tier 606 via the private network 610. The application tier 604 can communicate with the acquisition tier 606 via the private network 610. Further, the application tier 604 can communicate with the acquisition tier 606 and the operations and management tier 608 via the public network 612. Moreover, the acquisition tier 606 can communicate with the operations and management tier 608 via the public network 612. In a particular embodiment, elements of the application tier 604, including, but not limited to, a client gateway 650, can communicate directly with the client-facing tier 602.

The client-facing tier 602 can communicate with user equipment via an access network 696, such as an Internet Protocol Television (IPTV) access network. In an illustrative embodiment, customer premises equipment (CPE) 614, 622 can be coupled to a local switch, router, or other device of the access network 696. The client-facing tier 602 can communicate with a first representative set-top box device 616 via the first CPE 614 and with a second representative set-top box device 624 via the second CPE 622. In a particular embodiment, the first representative set-top box device 616 and the first CPE 614 can be located at a first customer premise, and the second representative set-top box device 624 and the second CPE 622 can be located at a second customer premise. In another particular embodiment, the first representative set-top box device 616 and the second representative set-top box device 624 can be located at a single customer premise, both coupled to one of the CPE 614, 622. The CPE 614, 622 can include routers, local area network devices, residential gateways, modems, such as digital subscriber line (DSL) modems, any other suitable devices for facilitating communication between a set-top box device and the access network 696, or any combination thereof. The CPE 614, 622, the first representative set-top box device 616, the second representative set-top box device 624, other CPE and/or set-top box devices, or any combination thereof, may be part of a peer-to-peer service 690, such as any one or more of the peer-to-peer services discussed with reference to FIG. 1, FIG. 3, or FIG. 4.

In an exemplary embodiment, the client-facing tier 602 can be coupled to the CPE 614, 622 via fiber optic cables. In another exemplary embodiment, the CPE 614, 622 can be digital subscriber line (DSL) modems that are coupled to one or more network nodes via twisted pairs, and the client-facing tier 602 can be coupled to the network nodes via fiber-optic cables. Each set-top box device 616, 624 can process data received via the access network 696, using an IPTV software platform, such as Microsoft® TV IPTV Edition.

The first set-top box device 616 can be coupled to a first external display device, such as a first television monitor 618, and the second set-top box device 624 can be coupled to a second external display device, such as a second television monitor 626. Moreover, the first set-top box device 616 can communicate with a first remote control 620, and the second set-top box device 624 can communicate with a second remote control 628. The set-top box devices 616, 624 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 616, 624 can receive data, video, or any combination thereof, from the client-facing tier 602 via the access network 696 and render or display the data, video, or any combination thereof, at the display device 618, 626 to which it is coupled. In an illustrative embodiment, the set-top box devices 616, 624 can include tuners that receive and decode television programming signals or packet streams for transmission to the display devices 618, 626. Further, the set-top box devices 616, 624 can include a STB processor 670 and a STB memory device 672 that is accessible to the STB processor 670. In one embodiment, a computer program, such as the STB computer program 674, can be embedded within the STB memory device 672.

In an illustrative embodiment, the client-facing tier 602 can include a client-facing tier (CFT) switch 630 that manages communication between the client-facing tier 602 and the access network 696 and between the client-facing tier 602 and the private network 610. As illustrated, the CFT switch 630 is coupled to one or more data servers, such as D-servers 632, that store, format, encode, replicate, or otherwise manipulate or prepare video content for communication from the client-facing tier 602 to the set-top box devices 616, 624. The CFT switch 630 can also be coupled to a terminal server 634 that provides terminal devices with a point of connection to the IPTV system 600 via the client-facing tier 602. In a particular embodiment, the CFT switch 630 can be coupled to a video-on-demand (VOD) server 636 that stores or provides VOD content imported by the IPTV system 600. Further, the CFT switch 630 is coupled to one or more video servers 680 that receive video content and transmit the content to the set-top boxes 616, 624 via the access network 696.

In an illustrative embodiment, the client-facing tier 602 can communicate with a large number of set-top boxes, such as the representative set-top box devices 616, 624, over a wide geographic area, such as a metropolitan area, a viewing area, a statewide area, a regional area, a nationwide area or any other suitable geographic area, market area, or subscriber or customer group that can be supported by networking the client-facing tier 602 to numerous set-top box devices. In a particular embodiment, the CFT switch 630, or any portion thereof, can include a multicast router or switch that communicates with multiple set-top box devices via a multicast-enabled network.

As illustrated in FIG. 6, the application tier 604 can communicate with both the private network 610 and the public network 612. The application tier 604 can include a first application tier (APP) switch 638 and a second APP switch 640. In a particular embodiment, the first APP switch 638 can be coupled to the second APP switch 640. The first APP switch 638 can be coupled to an application server 642 and to an OSS/BSS gateway 644. In a particular embodiment, the application server 642 can provide applications to the set-top box devices 616, 624 via the access network 696, which enable the set-top box devices 616, 624 to provide functions, such as interactive program guides, video gaming, display, messaging, processing of VOD material and other IPTV content, etc. In a particular embodiment, the OSS/BSS gateway 644 includes operation systems and support (OSS) data, as well as billing systems and support (BSS) data. In one embodiment, the OSS/BSS gateway 644 can provide or restrict access to an OSS/BSS server 664 that stores operations and billing systems data.

The second APP switch 640 can be coupled to a domain controller 646 that provides Internet access, for example, to users at their computers 668 via the public network 612. For example, the domain controller 646 can provide remote Internet access to IPTV account information, e-mail, personalized Internet services, or other online services via the public network 612. In addition, the second APP switch 640 can be coupled to a subscriber and system store 648 that includes account information, such as account information that is associated with users who access the IPTV system 600 via the private network 610 or the public network 612. In an illustrative embodiment, the subscriber and system store 648 can store subscriber or customer data and create subscriber or customer profiles that are associated with IP addresses, stock-keeping unit (SKU) numbers, other identifiers, or any combination thereof, of corresponding set-top box devices 616, 624. In another illustrative embodiment, the subscriber and system store can store data associated with capabilities of set-top box devices associated with particular customers.

In a particular embodiment, the application tier 604 can include a client gateway 650 that communicates data directly to the client-facing tier 602. In this embodiment, the client gateway 650 can be coupled directly to the CFT switch 630. The client gateway 650 can provide user access to the private network 610 and the tiers coupled thereto. In an illustrative embodiment, the set-top box devices 616, 624 can access the IPTV system 600 via the access network 696, using information received from the client gateway 650. User devices can access the client gateway 650 via the access network 696, and the client gateway 650 can allow such devices to access the private network 610 once the devices are authenticated or verified. Similarly, the client gateway 650 can prevent unauthorized devices, such as hacker computers or stolen set-top box devices from accessing the private network 610, by denying access to these devices beyond the access network 696.

For example, when the first representative set-top box device 616 accesses the client-facing tier 602 via the access network 696, the client gateway 650 can verify subscriber information by communicating with the subscriber and system store 648 via the private network 610. Further, the client gateway 650 can verify billing information and status by communicating with the OSS/BSS gateway 644 via the private network 610. In one embodiment, the OSS/BSS gateway 644 can transmit a query via the public network 612 to the OSS/BSS server 664. After the client gateway 650 confirms subscriber and/or billing information, the client gateway 650 can allow the set-top box device 616 to access IPTV content and VOD content at the client-facing tier 602. If the client gateway 650 cannot verify subscriber information for the set-top box device 616, e.g., because it is connected to an unauthorized twisted pair, the client gateway 650 can block transmissions to and from the set-top box device 616 beyond the access network 696.

As indicated in FIG. 6, the acquisition tier 606 includes an acquisition tier (AQT) switch 652 that communicates with the private network 610. The AQT switch 652 can also communicate with the operations and management tier 608 via the public network 612. In a particular embodiment, the AQT switch 652 can be coupled to a live acquisition server 654 that receives or acquires television content, movie content, advertisement content, other video content, or any combination thereof, from a broadcast service 656, such as a satellite acquisition system or satellite head-end office. In a particular embodiment, the live acquisition server 654 can transmit content to the AQT switch 652, and the AQT switch 652 can transmit the content to the CFT switch 630 via the private network 610.

In an illustrative embodiment, content can be transmitted to the D-servers 632, where it can be encoded, formatted, stored, replicated, or otherwise manipulated and prepared for communication from the video server(s) 680 to the set-top box devices 616, 624. The CFT switch 630 can receive content from the video server(s) 680 and communicate the content to the CPE 614, 622 via the access network 696. The set-top box devices 616, 624 can receive the content via the CPE 614, 622, and can transmit the content to the television monitors 618, 626. In an illustrative embodiment, video or audio portions of the content can be streamed to the set-top box devices 616, 624.

Further, the AQT switch 652 can be coupled to a video-on-demand importer server 658 that receives and stores television or movie content received at the acquisition tier 606 and communicates the stored content to the VOD server 636 at the client-facing tier 602 via the private network 610. Additionally, at the acquisition tier 606, the video-on-demand (VOD) importer server 658 can receive content from one or more VOD sources outside the IPTV system 600, such as movie studios and programmers of non-live content.

The VOD importer server 658 can transmit the VOD content to the AQT switch 652, and the AQT switch 652, in turn, can communicate the material to the CFT switch 630 via the private network 610. The VOD content can be stored at one or more servers, such as the VOD server 636.

When users issue requests for VOD content via the set-top box devices 616, 624, the requests can be transmitted over the access network 696 to the VOD server 636, via the CFT switch 630. Upon receiving such requests, the VOD server 636 can retrieve the requested VOD content and transmit the content to the set-top box devices 616, 624 across the access network 696, via the CFT switch 630. The set-top box devices 616, 624 can transmit the VOD content to the television monitors 618, 626. In an illustrative embodiment, video or audio portions of VOD content can be streamed to the set-top box devices 616, 624.

FIG. 6 further illustrates that the operations and management tier 608 can include an operations and management tier (OMT) switch 660 that conducts communication between the operations and management tier 608 and the public network 612. In the embodiment illustrated by FIG. 6, the OMT switch 660 is coupled to a TV2 server 662. Additionally, the OMT switch 660 can be coupled to an OSS/BSS server 664 and to a simple network management protocol (SNMP) monitor 686 that monitors network devices within or coupled to the IPTV system 600. In a particular embodiment, the OMT switch 660 can communicate with the AQT switch 652 via the public network 612.

In an illustrative embodiment, the live acquisition server 654 can transmit content to the AQT switch 652, and the AQT switch 652, in turn, can transmit the content to the OMT switch 660 via the public network 612. In this embodiment, the OMT switch 660 can transmit the content to the TV2 server 662 for display to users accessing the user interface at the TV2 server 662. For example, a user can access the TV2 server 662 using a personal computer 668 coupled to the public network 612.

Figure 7:
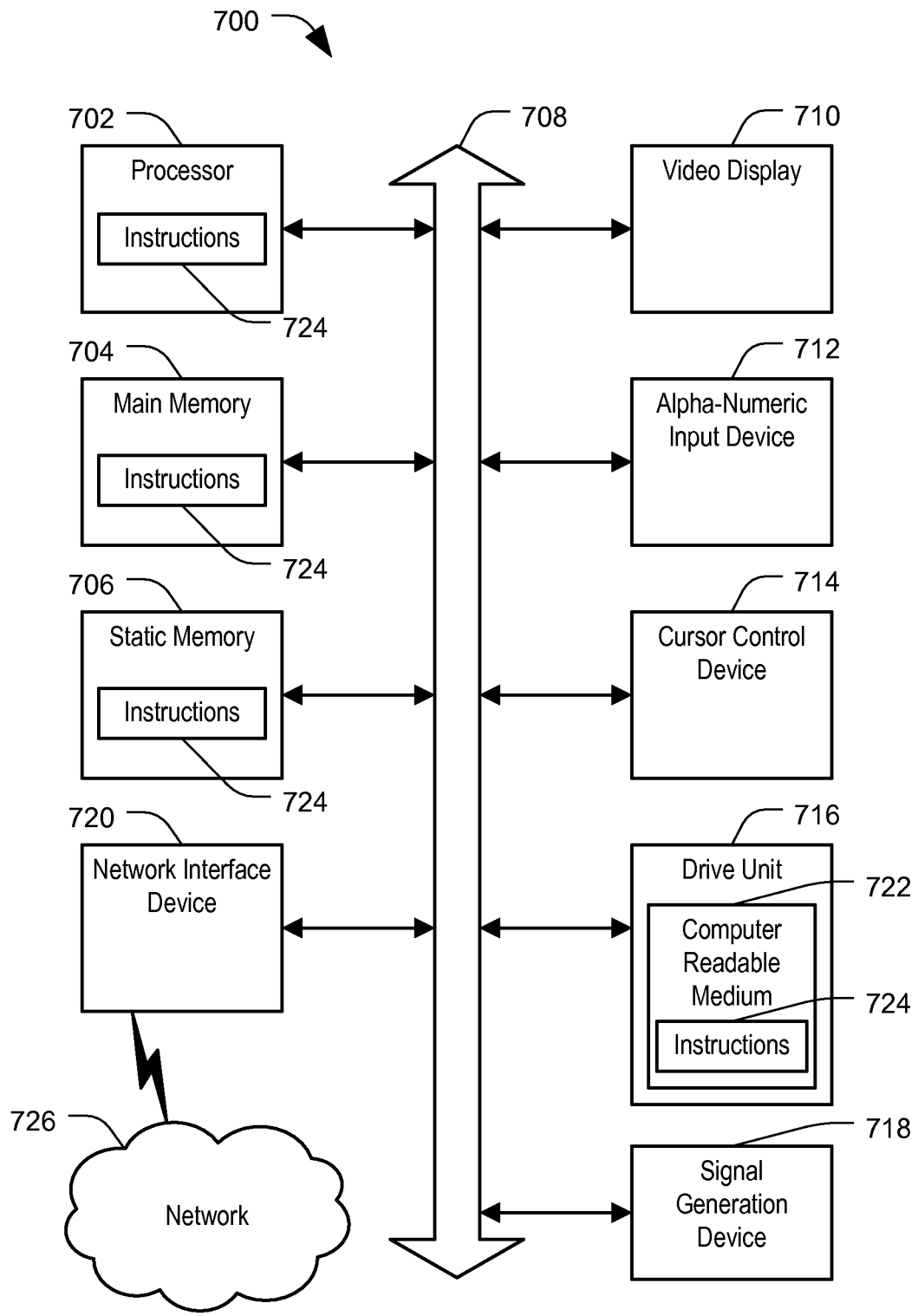
FIG. 7 is a diagram illustrating an embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. For example, the computer system 700 may include or be included within any one or more of the A-servers, D-servers, residential gateways, set-top box devices, peer network elements, other servers or other computing devices discussed with reference to FIGS. 1-6. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 can include a main memory 704 and a static memory 706, that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse or remote control. The computer system 700 can also include a disk drive unit 716, a signal generation device 718, such as a speaker, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be embedded in software programs executable by a computer system and implemented by a processor executing the software programs. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any one or more of a computer-readable medium or other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:

receiving, at a first media playback device, a channel change request, the channel change request directed to changing the first media playback device from receiving a first television channel to receiving a second television channel;

in response to receiving the channel change request, determining whether information identifying a second media playback device is stored at a local memory of the first media playback device, wherein the second media playback device stores channel change data associated with the second television channel;

in response to determining that the information identifying the second media playback device is not stored at the local memory of the first media playback device, sending, from the first media playback device to a peer-to-peer service server via a network connection, an identification request to identify the second media playback device, wherein the peer-to-peer service server includes multicast transmission data that indicates which data stream each peer element of a peer-to-peer network is receiving, each data stream corresponding to a television channel;

after sending the identification request:
  receiving, from the peer-to-peer service server via the network connection, identification data identifying the second media playback device;
  sending, from the first media playback device to the second media playback device based on the identification data, a channel change data request;
  in response to sending the channel change data request, receiving the channel change data from the second media playback device, wherein the channel change data includes a set of data packets including video data corresponding to the second television channel;
  storing, at a memory of the first media playback device, the identification data identifying the second media playback device and data indicating that the second media playback device is receiving a multicast transmission associated with the second television channel;
  after receiving the channel change data, sending a request to join a multicast transmission associated with the second television channel;
  after sending the request to join the multicast transmission associated with the second television channel, determining that a particular data packet of the multicast transmission associated with the second television channel is missing or corrupt;

accessing, from the memory of the first media playback device based on the data indicating that the second media playback device is receiving a multicast transmission associated with the second television channel, the identification data identifying the second media playback device; and sending, from the first media playback device to the second media playback device based on the identification data, a request for the particular data packet.

2. The method of claim 1, wherein the channel change data is received from the second media playback device at a first rate that is higher than a second rate at which data is received from a media data server.

3. The method of claim 1, further comprising, after receiving the channel change data, sending a multicast group join request to a multicast group associated with the second television channel.

4. The method of claim 1, further comprising:
in response to a data packet for the second television channel being corrupt or missing, sending to the peer-to-peer service server a second identification request to identify a third media playback device tuned to the second television channel;
receiving, from the peer-to-peer service server an identity of the third media playback device; and
sending to the third media playback device a reliable user datagram protocol request for data corresponding to the data packet.

5. A system comprising:
a television receiver adapted to receive television data from a server;
a processor; and
a memory coupled to the processor, the memory including instructions executable by the processor to perform operations comprising:
in response to receipt of a channel change request at the television receiver to change from receiving a first television channel to receiving a second television channel, determining whether information identifying a media playback device is stored at the memory, wherein the media playback device stores channel change data associated with the second television channel;
in response to determining that the information identifying the media playback device is not stored at the memory, causing a transmitter to send, to a peer-to-peer service server via a network connection, an identification request to identify the media playback device, wherein the peer-to-peer service server includes multicast transmission data that indicates which data stream each peer element of a peer-to-peer network is receiving, each data stream corresponding to a television channel;
after sending the identification request:
receiving, from the peer-to-peer service server via the network connection, identification data identifying the media playback device;
causing the transmitter to send a channel change data request to the media playback device, the channel change data request based on the identification data; and
in response to sending the channel change data request, receiving the channel change data from the media playback device based on availability of the channel change data from the media playback device, wherein the channel change data includes a set of data packets including video data corresponding to the second television channel;
storing the identification data identifying the media playback device and data indicating that the media playback device is receiving a multicast transmission associated with the television channel;
after receiving the channel change data, causing the transmitter to send a request to join a multicast transmission associated with the television channel;
after sending the request to join the multicast transmission associated with the television channel, determining that a particular data packet of the multicast transmission associated with the television channel is missing or corrupt;
accessing, based on the data indicating that the media playback device is receiving a multicast transmission associated with the television channel, the identification data identifying the media playback device; and
causing the transmitter to send, to the media playback device based on the identification data, a request for the particular data packet.

6. The system of claim 5, wherein the operations further comprise causing the transmitter to send the channel change data to a peer network element in the peer-to-peer network in response to receiving a second channel change data request from the peer network element.

7. The system of claim 6, wherein the operations further comprise causing the transmitter to send the channel change data to the peer network element at a first rate that is higher than a second rate at which the television data is received from the server.

8. The system of claim 5, wherein the operations further comprise, in response to not receiving the identification data from the peer-to-peer service server or not receiving the channel change data from the media playback device, causing the transmitter to send the channel change data request to the server.

9. The system of claim 5, wherein the identification data identifies a plurality of media playback devices including the media playback device, and further comprising causing the transmitter to send channel change data requests to at least a portion of the plurality of media playback devices to enable receipt of channel change data from multiple media playback devices to avoid burdening a single media playback device with providing all of the channel change data.

10. The system of claim 5, wherein the television data comprises a plurality of television data packets.

11. The system of claim 5, wherein, after the channel change data is received from the media playback device, the television receiver receives second channel media content from the server.

12. The method of claim 1, wherein the channel change data populates a media data buffer to reduce a time delay between changing the first media playback device from the first television channel to the second television channel and displaying second channel media content.

13. The method of claim 1, wherein the channel change data includes media content data received at the second media playback device from a media data server within a particular time period.

14. A computer-readable storage device comprising instructions that, when executed by a processor, cause the processor to perform operations comprising:
receiving a channel change request, the channel change request associated with changing a first media playback device from receiving a first television channel to receiving a second television channel;

in response to receiving the channel change request, determining whether information identifying a second media playback device is stored at a local memory of the first media playback device, wherein the second media playback device stores channel change data associated with the second television channel;

in response to determining that the information identifying the second media playback device is not stored at the local memory of the first media playback device, causing a transmitter to send, to a peer-to-peer service server via a network connection, an identification request to identify the second media playback device, wherein the peer-to-peer service server includes multicast transmission data that indicates which data stream each peer element of a peer-to-peer network is receiving, each data stream corresponding to a television channel;

after sending the identification request:
receiving, from the peer-to-peer service server via the network connection, identification data identifying the second media playback device;
causing the transmitter to send, to the second media playback device, a channel change data request, the channel change data request based on the identification data; and
in response to sending the channel change data request, receiving the channel change data from the second media playback device, wherein the channel change data includes a set of data packets including video data corresponding to the second television channel;

storing, at a memory of the first media playback device, the identification data identifying the second media playback device and data indicating that the second media playback device is receiving a multicast transmission associated with the second television channel;

after receiving the channel change data, causing the transmitter to send a request to join a multicast transmission associated with the second television channel;

after sending the request to join the multicast transmission associated with the second television channel, determining that a particular data packet of the multicast transmission associated with the second television channel is missing or corrupt;

accessing, from the memory based on the data indicating that the second media playback device is receiving a multicast transmission associated with the second television channel, the identification data identifying the second media playback device; and
causing the transmitter to send, to the second media playback device based on the identification data, a request for the particular data packet.

15. The computer-readable storage device of claim 14, wherein the channel change data is received from the second media playback device at a first rate that is higher than a second rate at which media content data is received at the first media playback device from a media data server.

16. The computer-readable storage device of claim 14, wherein the operations further comprise, after receiving the channel change data:
causing the transmitter to send a multicast group join request to a multicast group associated with the second television channel; and
receiving media content data associated with the second television channel from a media data server in response to sending the multicast group join request.

17. The computer-readable storage device of claim 14, wherein the peer-to-peer service server maintains a log of multicast join requests sent by each peer network element.

18. The computer-readable storage device of claim 14, wherein the first media playback device is coupled to a first central office, and wherein the second media playback device is coupled to a second central office.

19. The computer-readable storage device of claim 14, wherein the channel change data includes a plurality of data packets associated with the second television channel.

20. The computer-readable storage device of claim 14, wherein receiving the channel change data from the second media playback device enables the first media playback device to fill a media content buffer faster than the media content buffer would be filled by receiving media content data corresponding to the channel change data from a media content server.

21. The computer-readable storage device of claim 14, wherein the second media playback device receives content of the second television channel when the channel change request is received.

22. The method of claim 1, wherein the second media playback device receives content of the second television channel when the channel change request is received.

* * * * *